United States Patent
Hsien

(10) Patent No.: US 6,834,566 B1
(45) Date of Patent: Dec. 28, 2004

(54) METHOD FOR FORMING RECEIVING HOLE IN ADJUSTABLE SPANNER

(76) Inventor: Chih-Ching Hsien, 58, Ma Yuan West St., Taichung (TW)

(*) Notice: Subject to any disclaimer, the term of this patent is extended or adjusted under 35 U.S.C. 154(b) by 0 days.

(21) Appl. No.: 10/684,155

(22) Filed: Oct. 9, 2003

(51) Int. Cl.[7] .................................................. B21K 5/16
(52) U.S. Cl. ......................................................... 76/114
(58) Field of Search ................................. 76/114, 101.1

(56) References Cited

U.S. PATENT DOCUMENTS

| | | | | |
|---|---|---|---|---|
| 1,452,079 A | * | 4/1923 | Jones ........................... | 76/114 |
| 2,112,840 A | * | 4/1938 | Haist ............................ | 76/114 |
| 2,511,912 A | * | 6/1950 | Georse ......................... | 76/114 |
| 2,572,492 A | * | 10/1951 | Kempf ......................... | 72/341 |
| 2,643,569 A | * | 6/1953 | Barnes ......................... | 81/165 |

* cited by examiner

Primary Examiner—Douglas D Watts

(57) ABSTRACT

A working method includes: forming a slideway in a drive portion of an adjustable spanner, forming a substantially inverted U-shaped hole in the drive portion, and forming an oblique hole in a connection of the drive portion and a fixed jaw of the adjustable spanner. The slideway, the inverted U-shaped hole and the oblique hole form a receiving hole. Thus, the method uses the milling technology to simplify the procedure of forming the receiving hole in the adjustable spanner, thereby saving time and cost of fabrication.

10 Claims, 5 Drawing Sheets

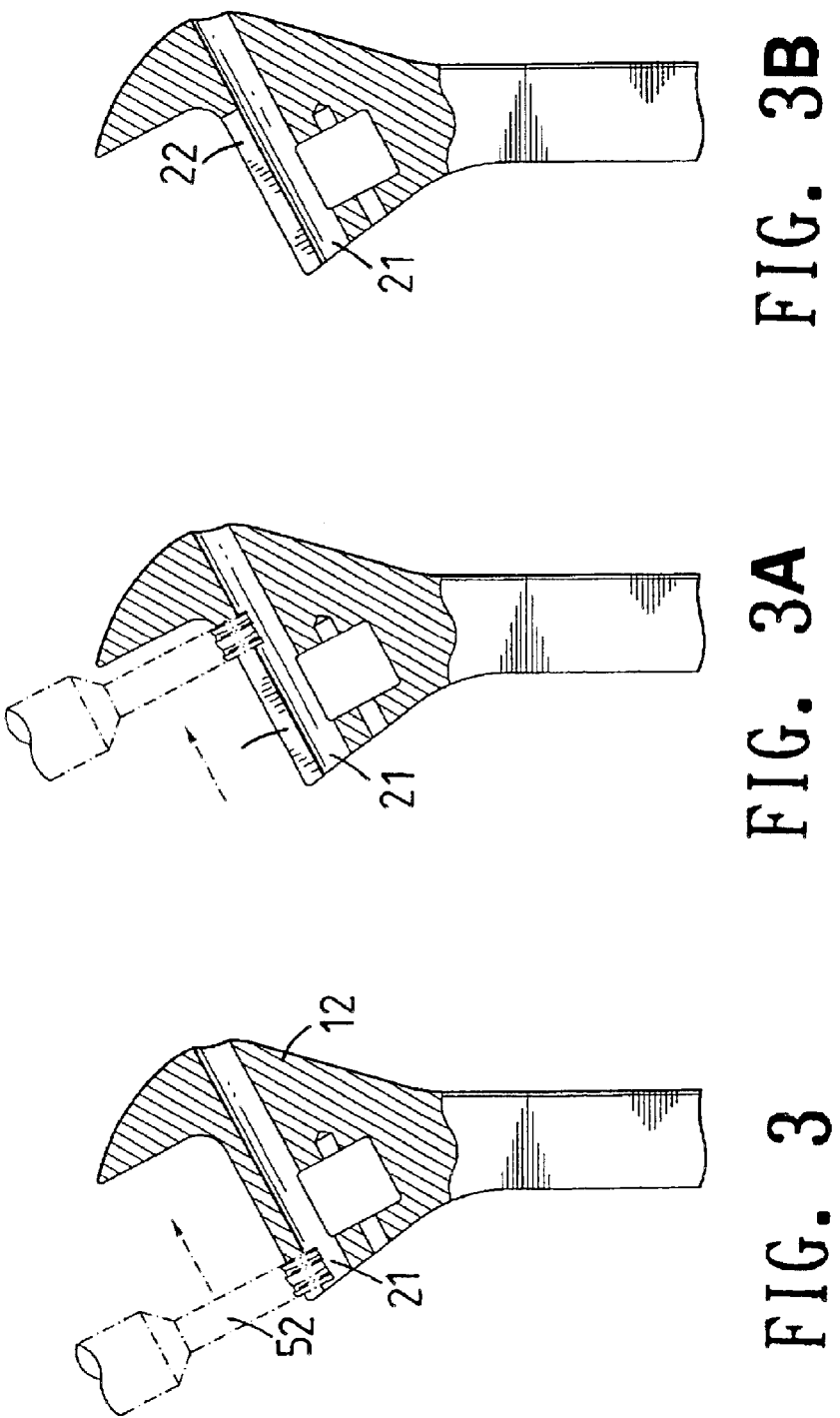

METHOD FOR FORMING RECEIVING HOLE IN ADJUSTABLE SPANNER

BACKGROUND OF THE INVENTION

1. Field of the Invention

The present invention relates to a method for forming a receiving hole in an adjustable spanner, and more particularly to a method using the milling technology to simplify the procedure of forming the receiving hole in the adjustable spanner, thereby saving time and cost of fabrication.

2. Description of the Related Art

A conventional adjustable spanner comprises a main body having an end formed with a drive portion formed with a fixed jaw and a slideway, an adjustment screw rotatably mounted in the main body, and a movable jaw movably mounted on the drive portion and having a bottom formed with a rack slidably mounted in the slideway and engaged with the adjustment screw. The rack is moved by rotation of the adjustment screw, so that the movable jaw is moved relative to the fixed jaw.

The slideway is formed by a planing technology which uses the relative movement between the cutter and the workpiece so as to form the slideway in the drive portion of the adjustable spanner. However, the cutter directly impacts the workpiece, so that the cutter is easily worn out during a period of time for replacement, thereby increasing costs of fabrication.

SUMMARY OF THE INVENTION

The primary objective of the present invention is to provide a method for forming a receiving hole in an adjustable spanner, thereby simplifying the working procedures.

Another objective of the present invention is to provide a method for forming a receiving hole in an adjustable spanner, thereby decreasing costs of fabrication.

A further objective of the present invention is to provide a method for forming a receiving hole in an adjustable spanner, thereby saving the manual work.

A further objective of the present invention is to provide a method for forming a receiving hole in an adjustable spanner, wherein the method uses the CNC to perform the drilling action without needing to replace the tool machine, so that the receiving hole is formed by the same working machine without needing to transfer the tool blank to another tool machine, thereby simplifying the procedure of making the tool, saving time and cost of fabrication, and saving the manual work.

A further objective of the present invention is to provide a method for forming a receiving hole in an adjustable spanner, wherein the method uses the milling technology to simplify the procedure of forming the receiving hole in the adjustable spanner, thereby saving time and cost of fabrication.

In accordance with the present invention, there is provided a working method, comprising the steps of:

forming a slideway in a drive portion of an adjustable spanner;

forming a substantially inverted U-shaped hole in the drive portion of the adjustable spanner, the inverted U-shaped hole communicating with the slideway; and forming an oblique hole in a connection of the drive portion of the adjustable spanner and a fixed jaw of the adjustable spanner, the oblique hole communicating with the slideway and the inverted U-shaped hole, so that the slideway, the inverted U-shaped hole and the oblique hole form a receiving hole.

Further benefits and advantages of the present invention will become apparent after a careful reading of the detailed description with appropriate reference to the accompanying drawings.

BRIEF DESCRIPTION OF THE DRAWINGS

FIG. 3 is a schematic operational view of the adjustable spanner as shown in FIG. 2B;

FIG. 3A is a schematic operational view of the adjustable spanner as shown in FIG. 3;

FIG. 3B is a schematic operational view of the adjustable spanner as shown in FIG. 3A;

DETAILED DESCRIPTION OF THE INVENTION

Figure 6:
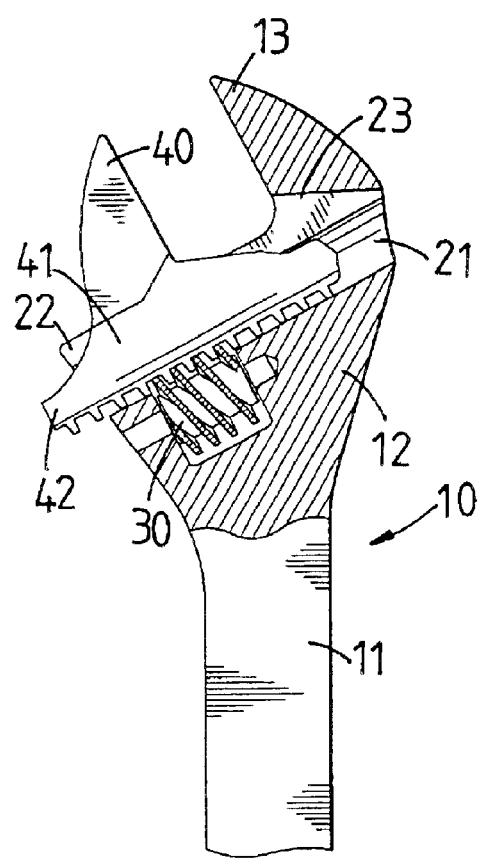
FIG. 6 is a partially cut-away plan cross-sectional view of the adjustable spanner in accordance with the preferred embodiment of the present invention.

Referring to the drawings and initially to FIG. 6, an adjustable spanner in accordance with the preferred embodiment of the present invention comprises a main body 10 having a first end formed with a drive portion 12 having a fixed jaw 13 and a slideway 21 and a second end formed with a handle portion 11, an adjustment screw 30 rotatably mounted in the main body 10, and a movable jaw 40 movably mounted on the drive portion 12 and having an end formed with a neck portion 41 having a bottom formed with a rack 42 slidably mounted in the slideway 21 of the drive portion 12 and engaged with the adjustment screw 30. Thus, the rack 42 is moved by rotation of the adjustment screw 30, so that the movable jaw 40 is moved relative to the fixed jaw 13.

Referring to FIGS. 1–5, a method for forming a receiving hole in an adjustable spanner in accordance with the preferred embodiment of the present invention comprises the following steps.

Figure 1:
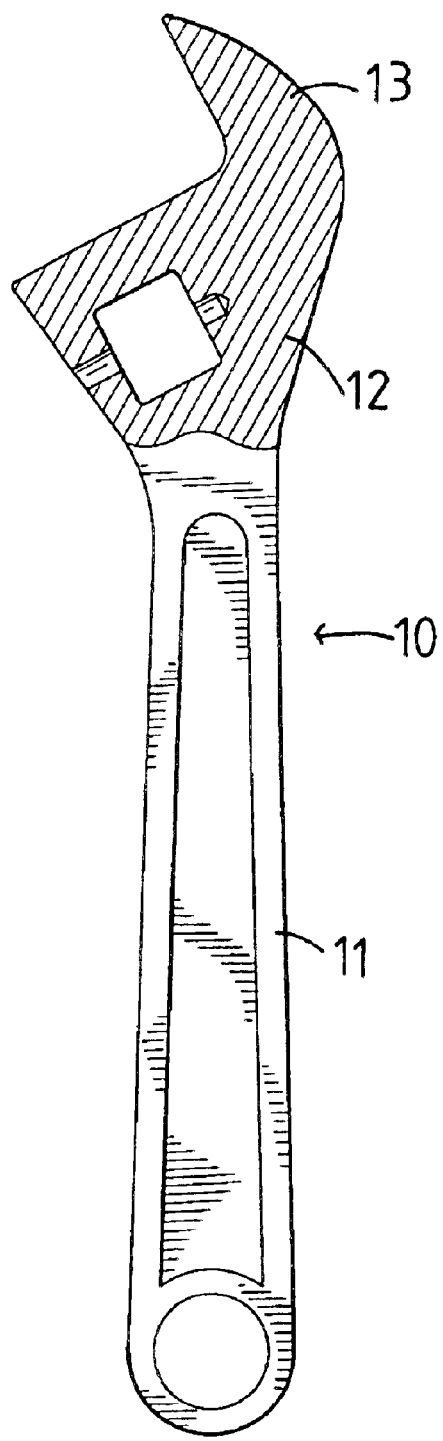
FIG. 1 is a partially plan cross-sectional view of the blank of an adjustable spanner in accordance with the preferred embodiment of the present invention.
Figure 2:
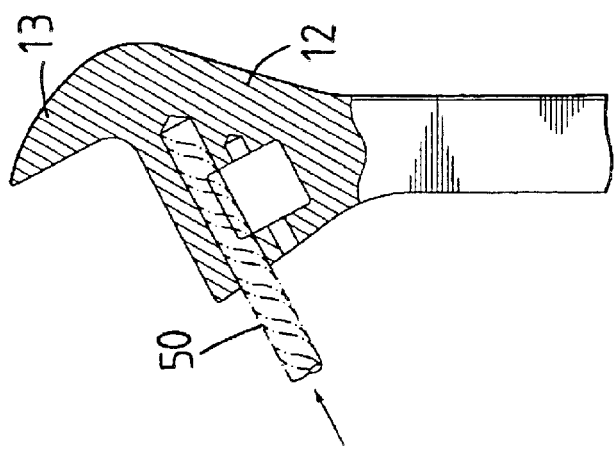
FIG. 2 is a schematic operational view of the adjustable spanner as shown in FIG. 1.
Figure 2A:
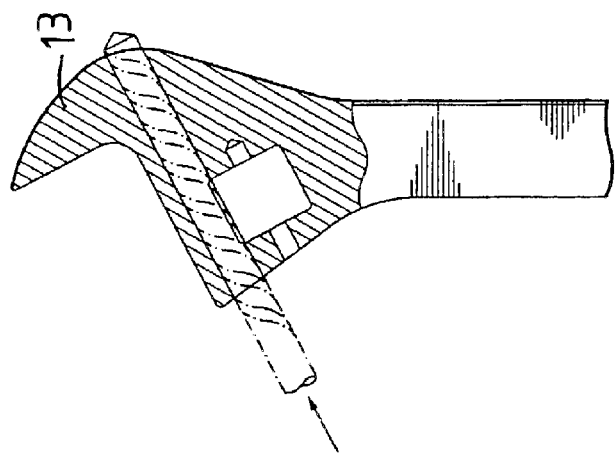
FIG. 2A is a schematic operational view of the adjustable spanner as shown in FIG. 2.
Figure 2B:
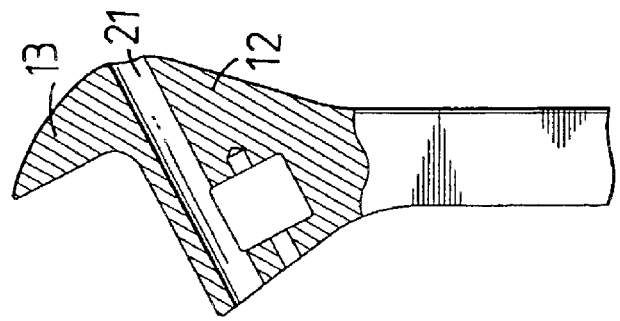
FIG. 2B is a schematic operational view of the adjustable spanner as shown in FIG. 2A.

As shown in FIGS. 1, 2, 2A and 2B, the drive portion 12 has an end formed with a fixed jaw 13. A drill 50 is drilled into the drive portion 12 as shown in FIGS. 2 and 2A, so that the drive portion 12 is formed with a circular slideway 21 which is extended from a first side of the drive portion 12 to a second side of the drive portion 12 as shown in FIG. 2B.

Then, as shown in FIGS. 3, 3A and 3B, the drive portion 12 is formed with a substantially inverted U-shaped hole 22 by a milling cutter 52. The inverted U-shaped hole 22 is located above the slideway 21 and has a lower end communicating with the slideway 21. In addition, the inverted U-shaped hole 22 is in parallel with the slideway 21.

Figure 4:
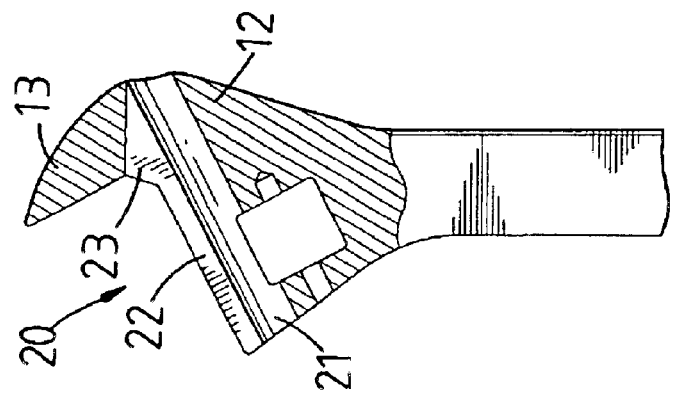
FIG. 4 is a schematic operational view of the adjustable spanner as shown in FIG. 3B.
Figure 4A:
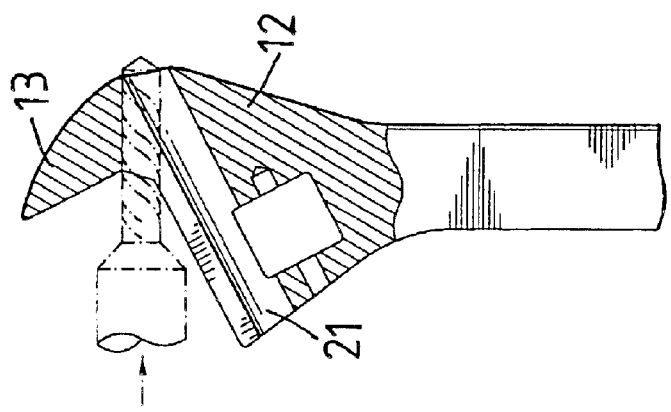
FIG. 4A is a schematic operational view of the adjustable spanner as shown in FIG. 4.
Figure 4B:
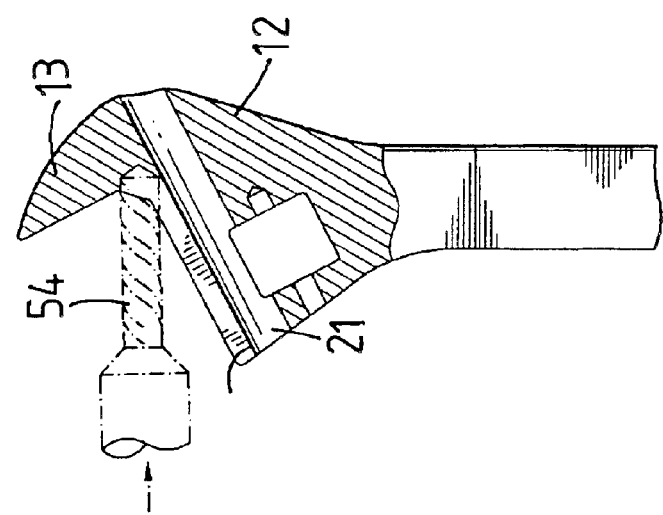
FIG. 4B is a schematic operational view of the adjustable spanner as shown in FIG. 4A.
Figure 5:
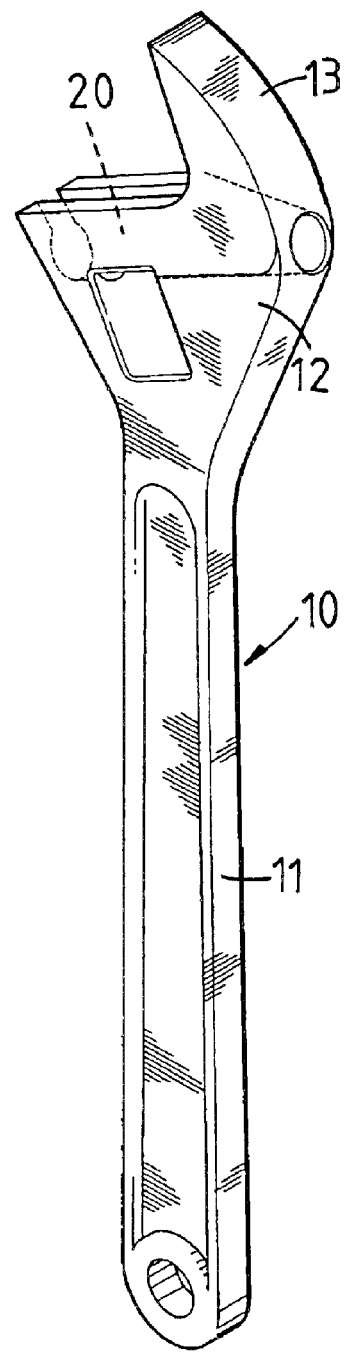
FIG. 5 is a partially perspective view of the adjustable spanner in accordance with the preferred embodiment of the present invention.

Then, as shown in FIGS. 4, 4A and 4B, a drill 54 is drilled into a connection of the drive portion 12 and the fixed jaw 13, so that the drive portion 12 is formed with an oblique hole 23 which is extended through the fixed jaw 13 and communicates with the slideway 21 and the inverted U-shaped hole 22. Thus, the slideway 21, the inverted U-shaped hole 22 and the oblique hole 23 form a receiving hole 20 as shown in FIG. 5.

The above-mentioned drilling and milling operations are controlled by CNC (computerized numerical control) which can store various working actions in the controller so as to execute various steps according to the process without using the manual work. Thus, the operator only needs to input the program number to start the destined procedures so as to work different workpieces.

Accordingly, the method of the present invention uses the CNC to perform the drilling action without needing to replace the tool machine, so that the receiving hole 20 is formed by the same working machine without needing to transfer the tool blank to another tool machine, thereby simplifying the procedure of making the tool, saving time and cost of fabrication, and saving the manual work.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A working method, comprising the steps of:

forming a slideway in a drive portion of an adjustable spanner;

forming a substantially inverted U-shaped hole in the drive portion of the adjustable spanner, the inverted U-shaped hole communicating with the slideway; and forming an oblique hole in a connection of the drive portion of the adjustable spanner and a fixed jaw of the adjustable spanner, the oblique hole communicating with the slideway and the inverted U-shaped hole, so that the slideway, the inverted U-shaped hole and the oblique hole form a receiving hole.

2. The working method in accordance with claim 1, wherein the slideway has a circular shape.

3. The working method in accordance with claim 1, wherein the slideway is formed in the drive portion of the adjustable spanner in a drilling manner.

4. The working method in accordance with claim 1, wherein the slideway is extended from a first side of the drive portion to a second side of the drive portion.

5. The working method in accordance with claim 1, wherein the inverted U-shaped hole is formed in the drive portion of the adjustable spanner in a milling manner.

6. The working method in accordance with claim 1, wherein the inverted U-shaped hole is located above the slideway and has a lower end communicating with the slideway.

7. The working method in accordance with claim 1, wherein the inverted U-shaped hole is in parallel with the slideway.

8. The working method in accordance with claim 1, wherein the oblique hole is formed in the connection of the drive portion and the fixed jaw in a drilling manner.

9. The working method in accordance with claim 1, wherein the oblique hole is extended through the fixed jaw.

10. The working method in accordance with claim 1, wherein the fixed jaw is located at an end of the drive portion.

* * * * *